US012640654B2

(12) United States Patent
Tan et al.

(10) Patent No.: US 12,640,654 B2
(45) Date of Patent: May 26, 2026

(54) NON-COMPLEMENTARY ACTIVE CLAMP FLYBACK (ACF) PRIMARY FIELD-EFFECT TRANSISTORS (FET) CONTROL

(71) Applicant: Cypress Semiconductor Corporation, San Jose, CA (US)

(72) Inventors: Soon Hwei Tan, Singapore (SG); Rajesh Karri, Visakhapatnam (IN); Hung-Chun Chen, Singapore (SG)

(73) Assignee: Infineon Technologies Americas Corp., El Segundo, CA (US)

( * ) Notice: Subject to any disclaimer, the term of this patent is extended or adjusted under 35 U.S.C. 154(b) by 544 days.

(21) Appl. No.: 18/332,600

(22) Filed: Jun. 9, 2023

(65) Prior Publication Data

US 2024/0048053 A1    Feb. 8, 2024

Related U.S. Application Data

(60) Provisional application No. 63/395,188, filed on Aug. 4, 2022.

(51) Int. Cl.
| | |
|---|---|
| *H02M 3/335* | (2006.01) |
| *H02M 1/00* | (2006.01) |
| *H02M 1/44* | (2007.01) |

(52) U.S. Cl.
CPC ..... *H02M 3/33507* (2013.01); *H02M 1/0025* (2021.05); *H02M 1/0045* (2021.05); *H02M 1/44* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569;

H02M 3/33507; H02M 2007/4815; H02M 2007/4818; H02M 1/083; H02M 3/33538; H02M 3/33546; H02M 3/33515;
(Continued)

(56) References Cited

U.S. PATENT DOCUMENTS

| | | | | | |
|---|---|---|---|---|---|
| 8,847,503 | B2 * | 9/2014 | Chang | ...................... | H04B 1/48 |
| | | | | | 315/219 |
| 10,868,473 | B2 * | 12/2020 | Chang | ..................... | H02M 1/08 |
| 11,114,945 | B2 * | 9/2021 | Ahmed | ..................... | H02J 7/00 |

OTHER PUBLICATIONS

"Current-Mode Active Clamp PWM Controller", Texas Instruments Incorporated, Oct. 2002, Jul. 2009 (Revised), 42 pages.
(Continued)

*Primary Examiner* — Jeffrey A Gblende

(57) ABSTRACT

In an example embodiment, a method comprising identifying, by a primary-side controlled Universal Serial Bus Power Delivery (USB-PD) alternating current to direct current (AC-DC) converter, a first pulse, wherein the first pulse is received from a pulse transformer. The method further includes determining that a threshold duration of time is satisfied. In response to determining that the threshold duration of time is satisfied, the method includes identifying a second pulse, wherein the second pulse is received from the pulse transformer. The first pulse and the second pulse are used for control of a high-side field effect transistor (FET) and a low-side FET, where the high-side FET is coupled to an active clamp flyback (ACF) circuit and the low-side FET is coupled to a flyback transformer of the USB-PD AC-DC converter. In response to identifying the second pulse, the method further includes controlling operation of the high-side FET or the low-side FET.

20 Claims, 8 Drawing Sheets

(58) Field of Classification Search
CPC ......... H02M 3/33576; H02M 3/33592; H02M
3/33553; H02M 3/33523; H02M 3/33561;
H02M 3/155; H02M 3/1582; H02M
1/4233; H02M 1/12; H02M 3/07; H02M
7/219; H02M 7/4815; H02M 1/0048;
H02M 7/4818; H02M 7/4826; H02M
7/4833; Y02B 70/1491
See application file for complete search history.

(56) References Cited

OTHER PUBLICATIONS

"UCC28780 High Frequency Active Clamp Flyback Controller",
Texas Instruments Incorporated, Oct. 2017, Feb. 2018 (Revised), 68
pages.
"Off-Line Battery Charger Circuit", Unitrode Corporation, Texas
Instruments Incorporated, 1999, 8 pages.

* cited by examiner

400

NON-COMPLEMENTARY ACTIVE CLAMP FLYBACK (ACF) PRIMARY FIELD-EFFECT TRANSISTORS (FET) CONTROL

PRIORITY

This application claims the priority and benefit of U.S. Provisional Application No. 63/395,188, filed on Aug. 4, 2022, the entire content of which is incorporated by reference herein.

TECHNICAL FIELD

This disclosure relates generally to power adapters or converters, and more particularly to primary adapters or converters with active clamp flyback (ACF) circuits.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, a power adapter can include an alternating current to direct current (AC-DC) converter which can include one or more integrated USB field-effect transistors (FET), such as primary high-side and low-side FETs.

BRIEF DESCRIPTION OF THE DRAWINGS

The disclosure is illustrated by way of example, and not of limitation, in the figures of the accompanying drawings.

DETAILED DESCRIPTION

Figure 1:
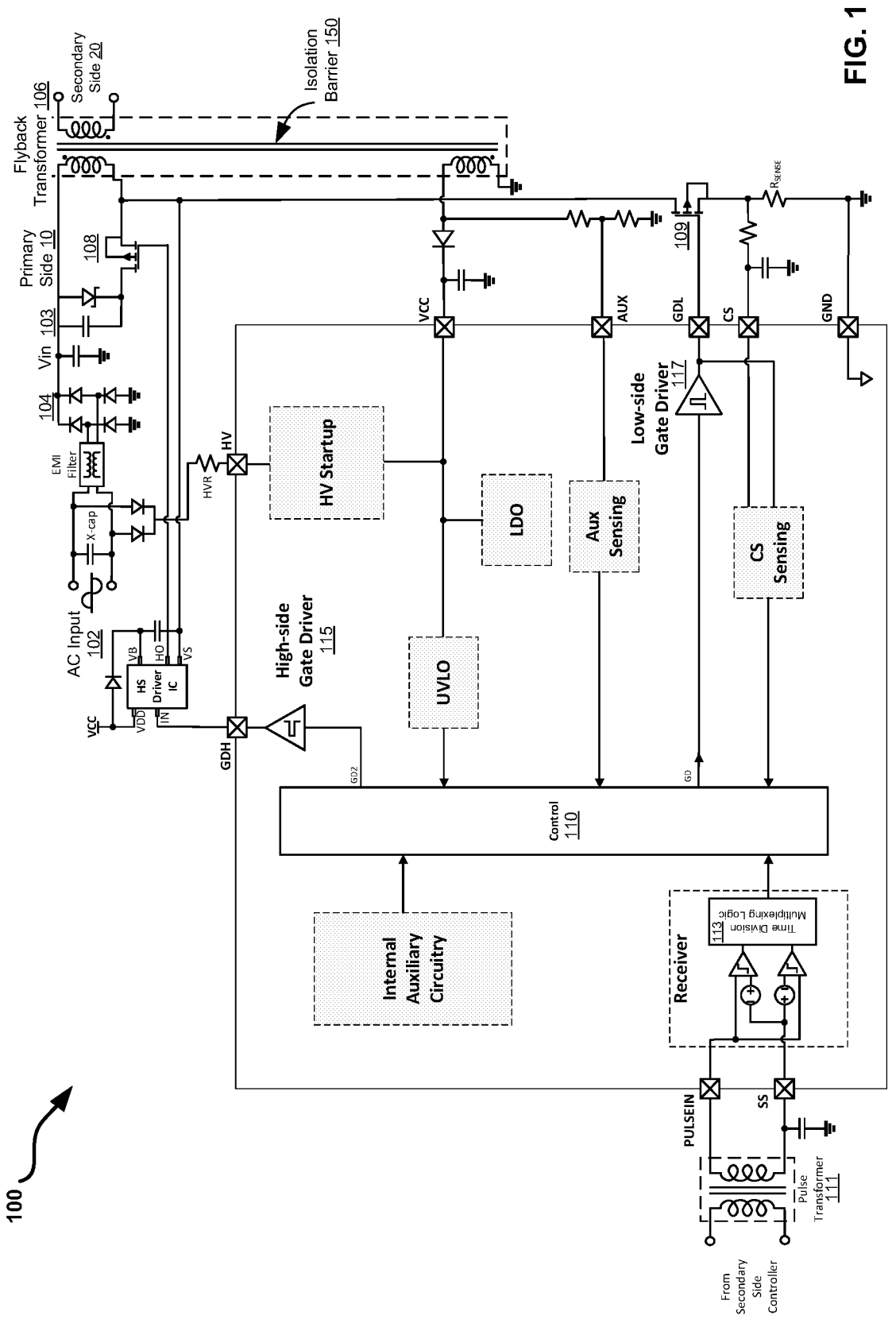
FIG. 1 is a block diagram of a primary-controlled alternating current to direct current (AC-DC) converter, according to one embodiment.

The following description sets forth numerous specific details such as examples of specific systems, components, methods, and so forth, in order to provide a good understanding of various embodiments of the techniques described herein for controlling non-complimentary active clamp flyback (ACF) field-effect transistors (FET), such as used in USB-PD power delivery applications. However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for controlling an ACF primary high-side FET and a primary low-side FET in a flyback converter coupled to power lines in electronic devices in USB power delivery (USB-PD). Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC power adapters, GaN-based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications. Still, it extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0, Release 1.1, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1/3.2, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors (also referred to as USB-C connector), etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. The Type-C plug and the Type-C receptacle are designed as reversible pairs that operate regardless of the plug-to-receptacle orientation for ease of use. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0, Revision 2.0, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., USB-enabled devices) may negotiate for more current and/or higher or lower voltages over a USB Type-C cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that both devices can accommodate and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled inline on the VBUS line and configured to turn power delivery on and off.

A USB-PD power source may be configured to draw power from an alternating current (AC) power adapter or another AC source. Thus, as part of an alternating current-to-direct current (AC-DC) conversion, some implementations may use a large bulk capacitor on the power source side of the VBUS line to remove the power signal's AC component. Turn-ON and turn-OFF of power switches (also called power FETs) may allow for further circuit protection based on analysis of current and voltage conditions and the detection of faults.

In one flyback converter, an active clamp flyback is driven by complementary switching of primary high-side and low-side FETs with a primary resonance and/or a secondary resonance method topology. However, both primary resonance and secondary resonance methods are unable to achieve and/or satisfy system efficiency due to the expense required in avoiding false toggling, maintaining additional components, and/or handling complicated loop circuitry. In some embodiments, non-complementary switching of primary high-side and low-side FETs can help to solve the aforementioned efficiency and/or expense problems by controlling the switching of primary high-side and low-side FETs without depending on whether the FET is configured in a high-side phase or low-side phase. However, non-complementary switching requires additional communication channels from primary to secondary to control an additional independent driver according to different operation modes, load current, and $V_{out}$ information. This will increase not just system cost but die cost due to an additional receiver circuit needed on-die.

Described herein are various embodiments of techniques for improving efficiency by providing a pulse edge transformer (PET) receiver time division multiplexing communication decoding scheme without using any additional board components or pins, which can be extended to alike systems. This scheme senses one or two negative pulses to determine the next positive pulse from the PET and is used to control operation of either low-side FET or high-side FET. In order to achieve this, the transmitter slows down the rising slew rate before the next falling edge after the first negative pulse.

With this scheme, different combinations of low-side FET and high-side FET control are made possible. For example, 1) turning on/off low-side FET continuously with high-side FET off; 2) turning on/off high-side FET continuously with low-side FET off; 3) turning on/off low-side FET and high-side FET alternatively with different and any duty cycle. Thus, non-complementary active clamp flyback topology can be realized easily with just a single PET. In some embodiments, the scheme can start with a low-side FET control phase and first looks for a negative pulse (FBOFF) being transmitted through the PET. A certain amount of timing filter (Tfilter) is applied, which, if another negative pulse (FBOFF) or positive pulse (FBON) is transmitted within this timing filter, the previous negative pulse (FBOFF) is ignored. After Tfilter expires, it looks for a second negative pulse (FBOFF) before declaring high-side FET control phase (GDH_PH). If a positive pulse (FBON) is transmitted before GDH_PH, the state is reset to initial again. It transits to GDH_PH immediately right after a second negative pulse (FBOFF) to enable prompt high-side FET on whenever needed. During high-side FET control phase (GDH_PH), a negative pulse (FBOFF) after Tfilter expires terminates high-side FET control phase. Such arrangement allows prompt low-side FET on and in-turn enables flexible and short Time-to-Zero (TTZ) control for optimum Zero Voltage Switching (ZVS). The low-side and high-side FET control phase are interchangeable. The timing filter can range from zero to any amount. However, with less timing filter, the system becomes more susceptible to analog and comparator noises.

This scheme can also be implemented with a slight alternative of using a high-side pulse instead of a low-side pulse. For example, the scheme can start with a low-side FET control phase and first looks for either a negative pulse (FBOFF) or another positive pulse (FBON) being transmitted through the PET after a timing filter (Tfilter). After the Tfilter expires, if a negative pulse (FBOFF) comes, it turns off the low-side FET and will wait for a next positive pulse. If a positive pulse (FBON) is transmitted, it enters a high-side FET control phase and waits for the turn off pulse of the primary FET. Once the turn off pulse of the low-side FET is received, it looks for the positive pulse on (FBON2) to turn on the high-side FET. The next FBOFF pulse will turn off the high-side FET and exit the high-side FET control state and will wait for an FBON pulse.

The embodiments described herein may address the above-mentioned and other challenges without the additional logic and circuits and complicated protocols described above by controlling the switching on or off between an ACF primary high-side FET and a primary low-side FET using a PET. The embodiments described herein can use a primary-side controlled alternating current to direct current (AC-DC)

converter to identify a first pulse. The first pulse can be a negative pulse transmitted from the PET. In some embodiments, the corresponding FET can be initially controlling the operation of a low-side FET. In some embodiments, the primary-side controlled AC-DC converter can determine that a threshold duration of time is satisfied. The threshold duration of time can be a configurable period of time, including zero. Determining that the threshold duration of time is satisfied can include measuring that a period of time from identifying the first pulse is greater than or equal to the threshold duration of time. In some embodiments, the primary-side AC-DC converter can identify a pulse during the period of time from identifying the first pulse to when the threshold duration of time is satisfied. In some embodiments, if the pulse identified is a positive pulse, the primary-side AC-DC converter resets to an initial state, such that the primary-side AC-DC converter seeks to identify a first pulse again (e.g., a first negative pulse) and determine that the threshold duration of time is satisfied. In some embodiments, in response to determining that the threshold duration of time is satisfied, the primary-side controlled AC-DC converter can identify a second pulse. The second pulse can be another negative pulse transmitted from the PET. In some embodiments, in response to identifying the second pulse, the primary-side controlled AC-DC converter can control the operation of the high-side FET (e.g., switch off the low-side FET and switch on the high-side FET). In some embodiments, while controlling the operation of the high-side FET, the primary-side controlled AC-DC converter can determine that the threshold duration of time is satisfied (e.g., that a period of time from identifying the second pulse is greater than or equal to the threshold duration of time). If the threshold duration of time is satisfied, the primary-side controlled AC-DC converter can control the operation of the low-side FET (e.g., switch on the low-side FET and switch off the high-side FET), thus allowing for prompt switching between low-side FET and high-side FET control phases. In some embodiments, the primary-side controlled AC-DC converter can identify another pulse (e.g., a negative pulse) while controlling operation of the high-side FET. In response to identifying the negative pulse, the primary-side AC-DC converter can control the operation of the low-side FET (e.g., switch on the low-side FET and switch off the high-side FET). In some embodiments, the primary-side AC-DC converter can then identify another pulse (e.g., a positive pulse). In response to identifying the positive pulse, the primary-side AC-DC converter can control the operation of the high-side FET (e.g., switch on the high-side FET and switch off the low-side FET). In some embodiments, the low-side and high-side FET control phases are interchangeable.

As noted above, there are no additional external components, board components, or terminals, as the board components and terminals used for switching between the primary high-side FET and low-side FET are the same. The dual-level pulse transformer may be coupled between the primary-side controller and the active clamp flyback in order to control the active clamp FET.

FIG. 1 is a block diagram of a primary-controlled alternating current to direct current (AC-DC) converter 100, according to an embodiment of the present disclosure. The AC-DC converter 100 can be part of an AC-DC power adapter device. The AC-DC converter can include a flyback transformer 106, a pulse edge transformer 111, a primary high-side FET 108 (e.g., as part of, or coupled to, an ACF circuit), a primary low-side FET 109, a primary-side controller, and a secondary-side controller.

The AC-DC converter 100 can be a flyback AC-DC converter that provides galvanic isolation between the AC input 102 and a DC output. The AC-DC converter 100 includes a primary side 10 disposed on the AC input side of the flyback transformer 106, and a secondary side 20 disposed on the DC output side of the flyback transformer 106. An isolation barrier 150 electrically isolates the primary side 10 from the secondary side 20. In primary-controlled mode, the primary side 10 of the flyback transformer 106 controls the operation of the AC-DC converter 100 since the only communication channel from the primary side 10 to the secondary side 20 is the voltage level provided by the flyback transformer 106 to the secondary side 20. The on-cycles of the primary side 10 and secondary side 20 are typically separated by a time interval during which the power stored in the flyback transformer 106 is transferred through a rectifier diode, which causes higher power loss and thereby reduces the efficiency.

Referring to FIG. 1, the primary side 10 of AC-DC converter 100 includes the AC input 102, a bridge rectifier 104, the flyback transformer 106, the primary high-side FET 108, the primary low-side FET 109, a control logic 110, the time division multiplexing logic 113, the high-side gate driver 115, the low-side gate driver 117, and the pulse transformer 111. In various embodiments, the secondary side 20 includes a secondary side controller, a synchronous rectifier (SR) circuit (e.g., an "SR"), a drain node (SR DRAIN), an output capacitor, and a Universal Serial Bus (USB) Type-C connector (not shown).

In various embodiments, on the primary side 10, the AC input 102 is configured to receive alternating current from a power source, e.g., such as a wall socket (not shown). The bridge rectifier 104 is coupled between an AC input 102 and the flyback transformer 106 to rectify the input voltage received at the AC input 102. The ACF circuit includes the primary high-side FET 108, which is coupled between the bridge rectifier 104 and the flyback transformer 106. The bottom of the left winding of the flyback transformer 106 is coupled to the drain of the primary high-side FET 108. The source of the primary high-side FET 108 is coupled to a terminal of a capacitor 103. One or more terminals of the capacitor 103 are coupled to the bridge rectifier 104. The flyback transformer 106 is coupled to conduct the AC current from bridge rectifier 104, through its primary coil and the primary high-side FET 108, to ground. An input capacitor can be coupled to the output of the bridge rectifier 104 to be charged to an input voltage (Vin) into the primary side 10 of the AC-DC converter 100. In these embodiments, the gate of the primary high-side FET 108 is coupled to the control logic 110 to control the on and off cycles of the flyback transformer 106. In some embodiments, the control logic 110 can be within the primary side controller. In some embodiments, the control logic 110 can be within a separate integrated circuit (IC), which is coupled to a control pin on the primary side controller.

The primary-side controller can be configured to receive one or more pulses from the secondary-side controller via the pulse edge transformer 111. The primary-side controller can include a high-side gate driver 115 and a low-side gate driver 117. The one or more pulses can be decoded via a time division multiplexing logic 113 to control the high-side gate driver 115 and/or the low-side gate driver 117.

In various embodiments, the time division multiplexing logic 113 may be implemented as hardware block(s) having one or more circuits that include various electronic components configured to process analog and/or digital signals and to perform one or more operations in response to control signal(s) and/or firmware instructions executed by a processor or an equivalent thereof. Examples of such electronic components include, without limitation, transistors, diodes, logic gates, state machines, micro-coded engines, and/or other circuit block(s) and analog/digital circuitry that may be configured to control hardware in response to control signals and/or firmware instructions.

Figure 2A:
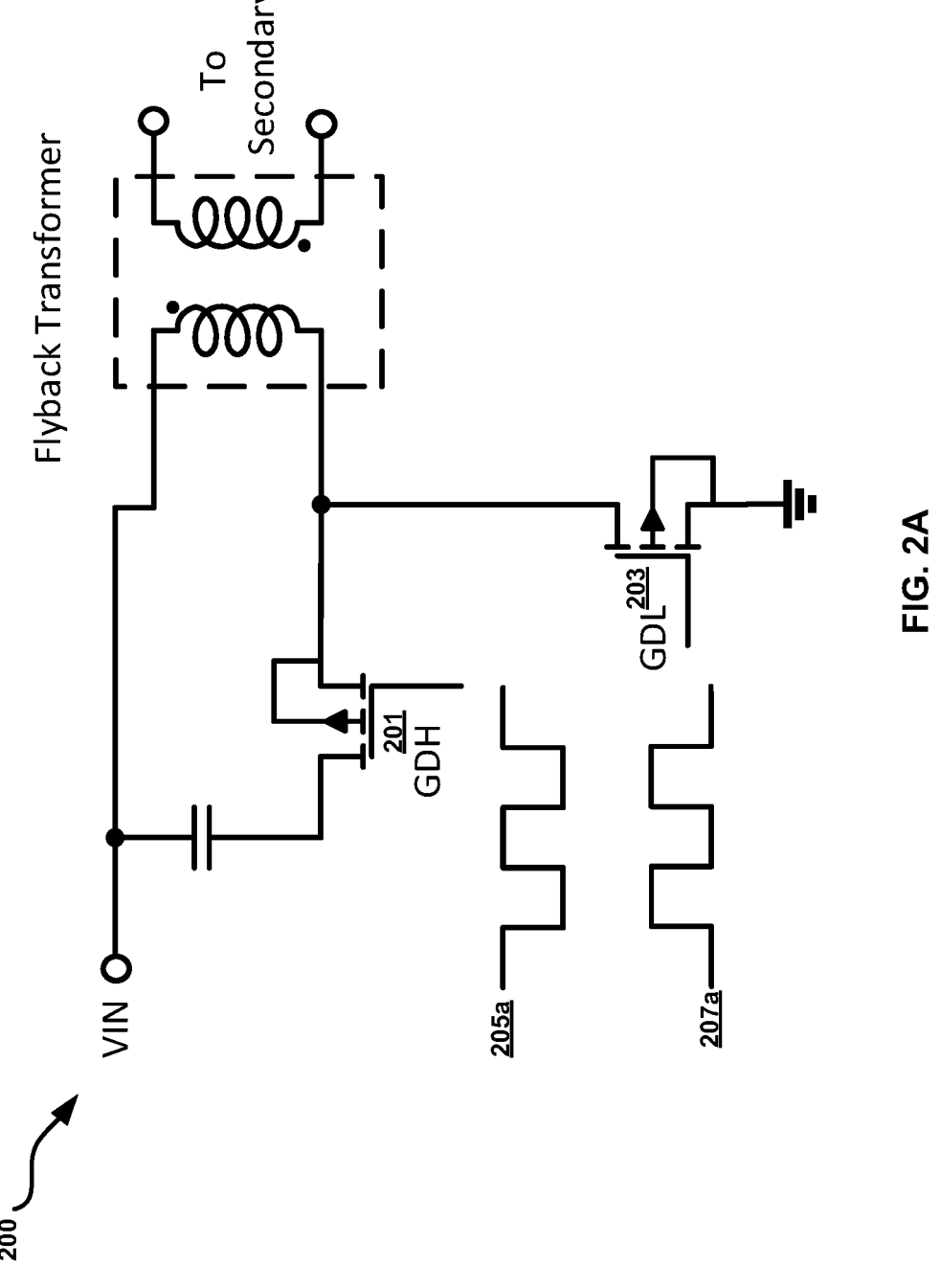
FIG. 2A is a block diagram of a primary-controlled flyback converter with a complementary active clamp flyback, according to one embodiment.

FIG. 2A is a block diagram of a primary-controlled flyback converter 200 with a complementary active clamp flyback circuit, in accordance with some embodiments of the present disclosure. In some embodiments, flyback converters can include clamps that can reduce the voltage and current stress on the switching components of flyback converters. For example, an active clamp flyback converter is a flyback converter with active clamping. Active clamps have clamp switches (e.g., high-side FETs) that switch to reduce stress on the power switches (e.g., low-side FETs) as compared to passive clamps. In some embodiments, an active clamp flyback converter can include a low-side FET 203 (e.g., the low-side FET 109 of FIG. 1) that functions as a power switch and a high-side FET 201 (e.g., the high-side FET 108 of FIG. 1) that functions as a clamp switch. In some embodiments, the high-side FET 201 can be operated in a complementary active clamp mode, where the high-side FET 201 turns on complementarily to the low-side FET based on load conditions. For example, the high-side FET 201 is turned off at signal 205*a* when the low-side FET 203 is turned on at signal 207*a*.

Figure 2B:
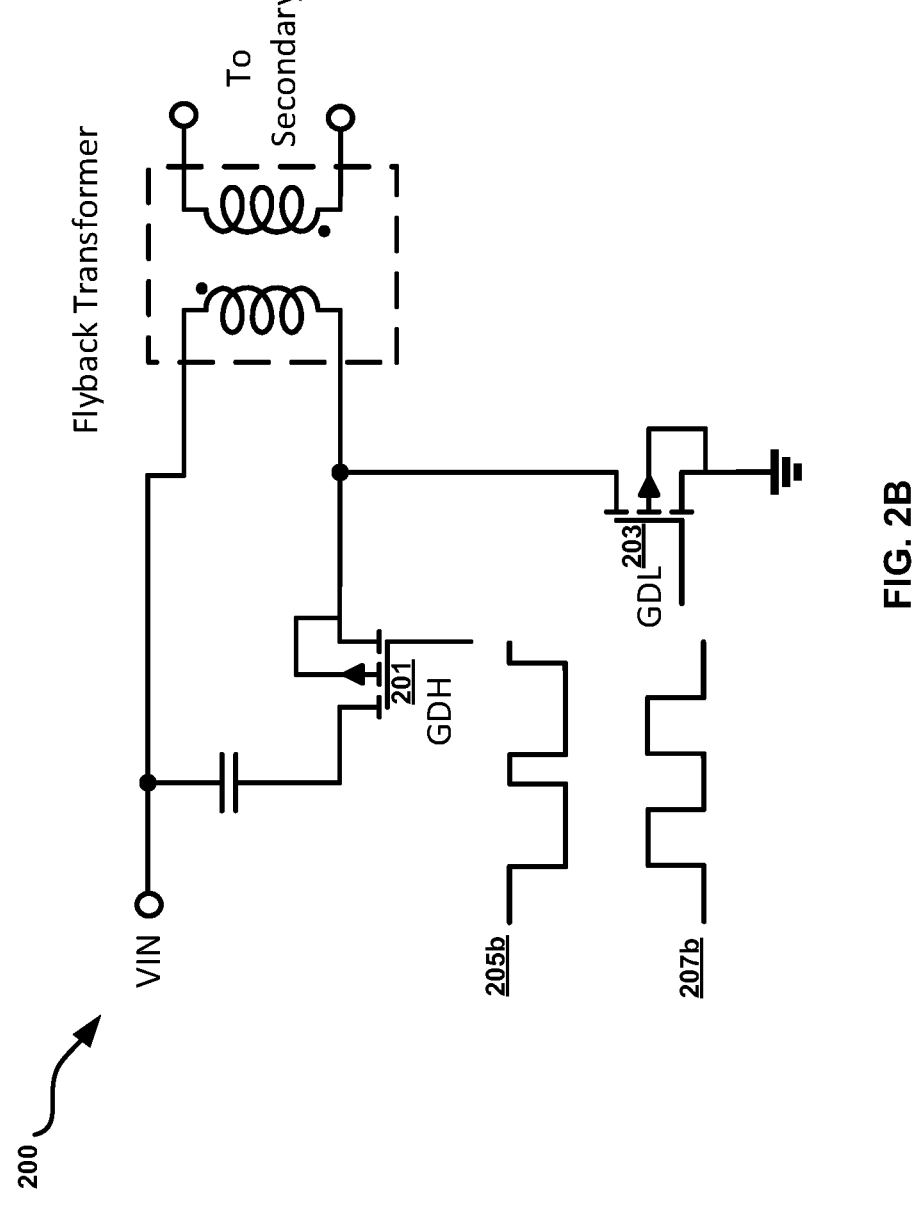
FIG. 2B is a block diagram of a primary-controlled flyback converter with a non-complementary active clamp flyback, according to one embodiment.

FIG. 2B is a block diagram of a primary-controlled flyback converter with a non-complementary active clamp flyback circuit, in accordance with some embodiments of the present disclosure. In some embodiments, flyback converters can include clamps that can reduce the voltage and current stress on the switching components of flyback converters. For example, an active clamp flyback converter is a flyback converter with active clamping. Active clamps have clamp switches (e.g., high-side FETs) that switch to reduce stress on the power switches (e.g., low-side FETs) as compared to passive clamps. In some embodiments, an active clamp flyback converter can include a low-side FET 203 (e.g., the low-side FET 109 of FIG. 1) that functions as a power switch and a high-side FET 201 (e.g., the high-side FET 108 of FIG. 1) that functions as a clamp switch. In some embodiments, the high-side FET 201 can be operated in a non-complementary active clamp mode, where the high-side FET 201 turns on and off independent of the low-side FET. For example, the high-side FET 201 is turned on and/or off at signal 205*b* at the same or different time from when the low-side FET 203 is turned on and/or off at signal 207*b*.

Figure 3A:
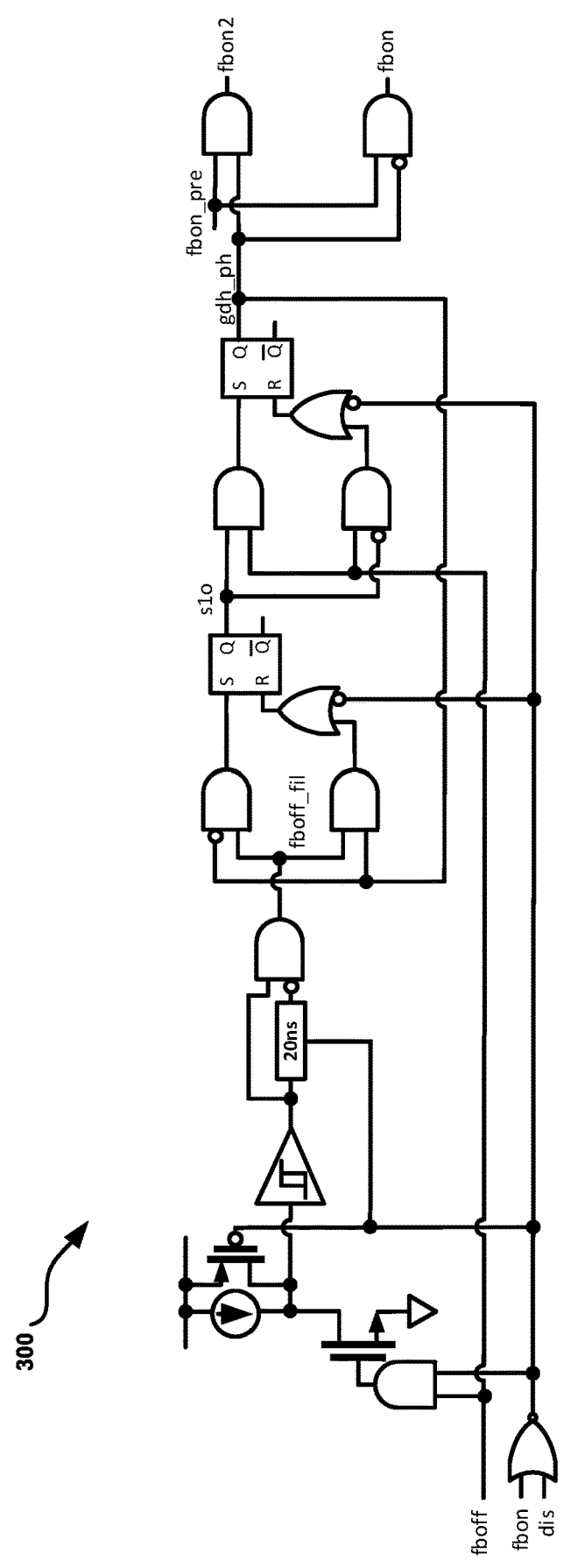
FIG. 3A is a block diagram of control circuitry of a primary-controlled flyback converter with a non-complementary active clamp flyback, according to one embodiment.

FIG. 3A is a block diagram 300 of control circuitry of a primary-controlled flyback converter with a non-complementary active clamp flyback with a primary-side field-effect transistor and a pulse edge transformer (PET), in accordance with some embodiments of the present disclosure. In some embodiments, the circuitry logic can start with a negative pulse ("fboff") being transmitted from the PET. A certain (e.g., predefined) amount of timing filter (Tfilter) is then applied, such as a period of time of 20 nanoseconds. During the period of time of the timing filter, if another negative pulse or positive pulse ("fbon") is transmitted from the PET, the previous negative pulse is ignored. After Tfilter expires ("fboff_fil"), if another negative pulse is transmitted from the PET, the state switches from a low-side FET control phase to a high-side FET control phase ("gdh_ph"). If a positive pulse is transmitted before gdh_ph, the state is reset to initial again. During the high-side FET control phase (gdh_ph), a negative pulse after Tfilter expires terminates the high-side FET control phase.

Figure 3B:
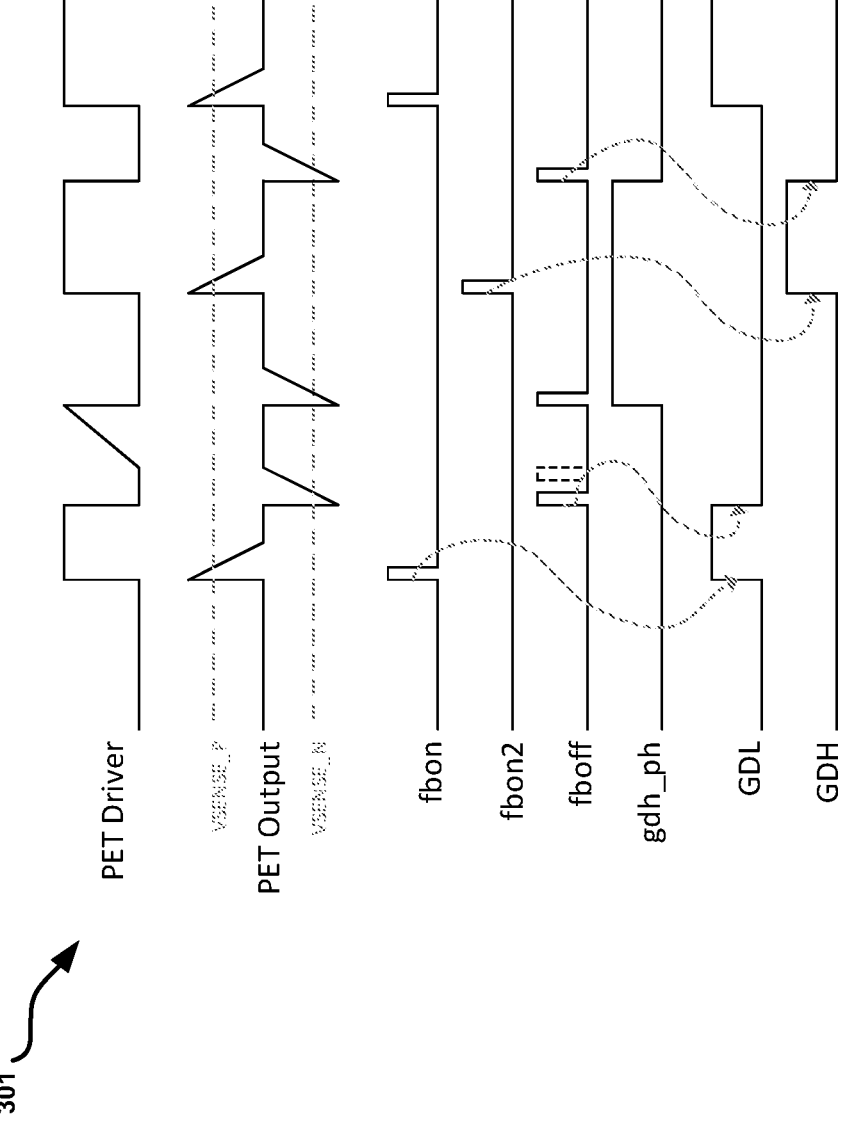
FIG. 3B is a signal flow diagram illustrating pulses of the primary-controlled flyback converter with a non-complementary active clamp flyback with the primary field-effect transistor and a pulse edge transformer of FIG. 3A, according to one embodiment.

FIG. 3B is a signal flow diagram 301 illustrating pulses of the primary-controlled flyback converter with a non-complementary active clamp flyback with the primary field-effect transistor and a pulse edge transformer of FIG. 3A, in accordance with some embodiments of the present disclosure. As illustrated in FIG. 3B, a pulse edge transformer driver (PET) can initially generate a positive pulse, which is illustrated with the rising edge at the PET output signal. The positive pulse is detected with the rising edge at the "fbon" signal. The positive pulse can turn on (e.g., switch on) the low-side FET ("GDL"). Subsequently, the PET receiver can detect a negative pulse, illustrated by the falling edge at the PET output signal. The negative pulse is detected with the falling edge at the "fboff" signal. After the negative pulse is detected, a filter is applied, as described herein with respect to FIG. 3A. After the filter expires, the PET receiver can detect another (e.g., a second) negative pulse, which is illustrated by the falling edge at the PET output signal. The second negative pulse is detected with the falling edge at the "fboff" signal. The second negative pulse can turn on the high-side FET control phase ("gdh_ph"). The PET receiver can detect a positive pulse with the rising edge at the "fbon2" signal, which turns on the high-side FET ("GDH"). During the high-side FET control phase ("gdh_ph"), the PET receiver can detect another (e.g., a third) negative pulse, as illustrated by the falling edge at the PET output signal. The negative pulse is detected with the falling edge at the "fboff" signal. The negative pulse can turn off the high-side FET ("GDH").

Figure 3C:
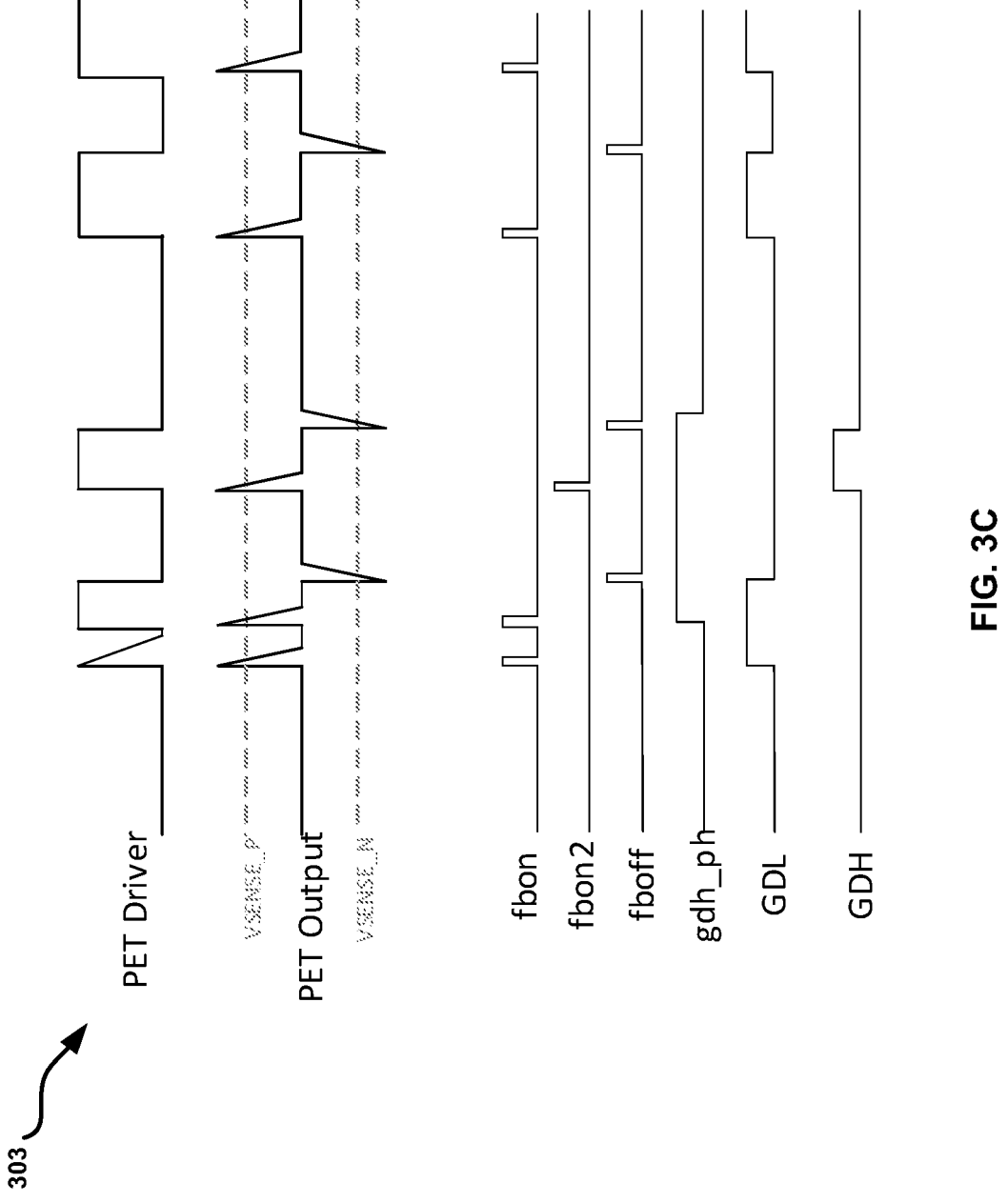
FIG. 3C is a signal flow diagram illustrating pulses of the primary-controlled flyback converter with a non-complementary active clamp flyback with the primary field-effect transistor and a pulse edge transformer of FIG. 3A, according to one embodiment.

FIG. 3C is a signal flow diagram 303 illustrating pulses of the primary-controlled flyback converter with a non-complementary active clamp flyback with the primary field-effect transistor and a pulse edge transformer of FIG. 3A, in accordance with some embodiments of the present disclosure. As illustrated in FIG. 3C, a pulse edge transformer driver (PET) can initially generate a positive pulse, which is illustrated with the rising edge at the PET output signal. The positive pulse is detected with the rising edge at the "fbon" signal. The positive pulse can turn on the low-side FET ("GDL"). Subsequently, the PET receiver can detect another positive pulse, illustrated by the rising edge at the PET output signal. The positive pulse is detected with the rising edge at the "fbon" signal. After the positive pulse is detected, a filter is applied, as described herein with respect to FIG. 3A. After the filter expires, the PET receiver can detect a negative pulse, which is illustrated by the falling edge at the PET output signal. The negative pulse is detected with the falling edge at the "fboff" signal. The negative pulse can turn off the low-side FET ("GDL"). In some embodiments, the PET receiver can detect a positive pulse, as illustrated by the rising edge at the PET output signal. The positive pulse is detected with the rising edge at the "fbon2" signal. The positive pulse can turn on the high-side FET ("GDH"). During the high-side FET control phase ("gdh_ph"), the PET receiver can detect a negative pulse, as illustrated by the falling edge at the PET output signal. The negative pulse is detected with the falling edge at the "fboff" signal. The negative pulse can turn off the high-side FET ("GDH").

Figure 4:
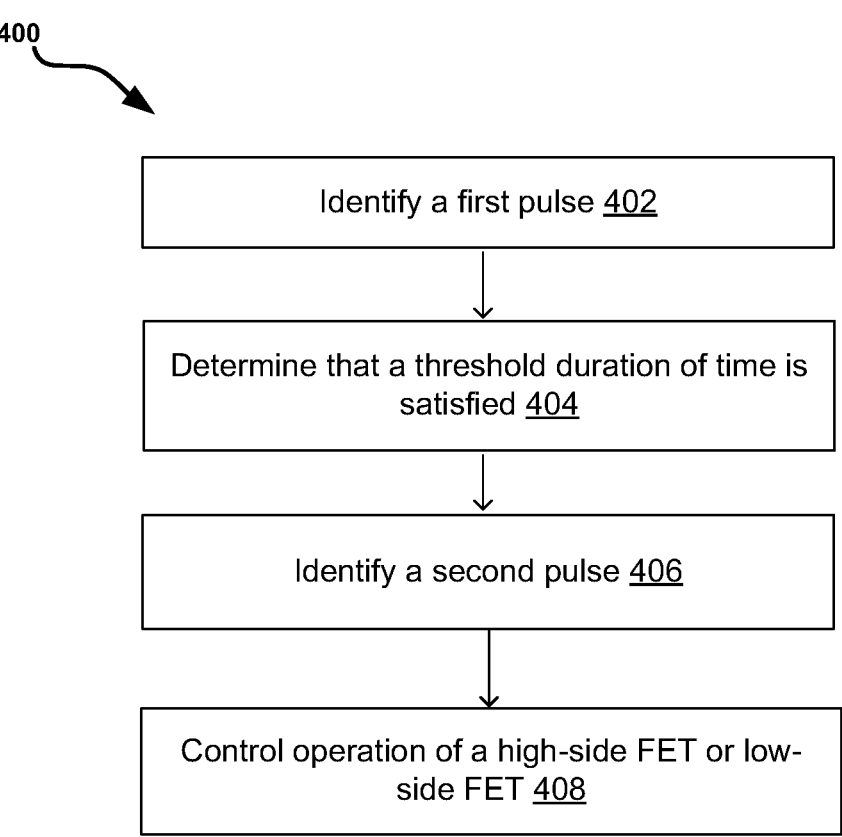
FIG. 4 is a flow diagram of a method of controlling operation of a primary high-side field-effect transistor and a primary low-side field-effect transistor using a pulse edge transformer in a primary-controlled flyback converter, according to one embodiment.

FIG. 4 is a flow diagram of a method 400 of controlling operation of a primary high-side field-effect transistor (FET) and a primary low-side FET using a pulse edge transformer in a primary-side controlled flyback converter, in accordance with some embodiments of the present disclosure. The method 400 may be performed by processing logic that comprises hardware (e.g., circuitry, dedicated logic, programmable logic, microcode, etc.), software, firmware, or a combination thereof. In one embodiment, a primary-side controller in a primary-controlled AC-DC flyback converter performs the method 400.

Referring to FIG. 4, the method 400 begins, at block 402, by the processing logic (e.g., a primary-side controlled Universal Serial Bus Power Delivery (USB-PD) AC-DC converter) identifying a first pulse. The first pulse can be a negative and/or a positive pulse transmitted from a pulse edge transformer (PET) (e.g., the pulse edge transformer 111 of FIG. 1) and decoded using, for example, the time division multiplexing logic 113 of FIG. 1. In some embodiments, the USB-PD AC-DC converter can be initially controlling operation of a low-side FET (e.g., the low-side FET can initially be switched on).

At block 404, the processing logic determines that a threshold duration of time is satisfied. The threshold duration of time can be a configurable and/or predefined period of time, including zero. Determining that the threshold duration of time is satisfied can include measuring that a period of time from identifying the first pulse is greater than or equal to the threshold duration of time.

In some embodiments, the processing logic can identify a pulse transmitted during the period of time from identifying the first pulse to when the threshold duration of time is satisfied. In some embodiments, if the pulse identified is a positive pulse, the processing logic identifies a another pulse (e.g., a first negative pulse) and determines that the threshold duration of time is satisfied.

At block 406, in response to determining that the threshold duration of time is satisfied, the processing logic identifies a second pulse. The second pulse can be another (e.g., a second) negative pulse transmitted from the PET. In some embodiments, the second pulse can be another positive pulse transmitted from the PET.

At block 408, in response to identifying the second pulse, the processing logic controls the operation of the high-side FET or the low-side FET. In some embodiments, controlling the operation of the high-side FET or the low-side FET includes controlling the operation of the high-side FET (e.g., switching off the low-side FET and switching on the high-side FET). In some embodiments, while controlling the operation of the high-side FET, the processing logic can determine that the threshold duration of time is satisfied (e.g., that a period of time from identifying the second pulse is greater than or equal to the threshold duration of time). If the threshold duration of time is satisfied, the processing logic can control the operation of the low-side FET (e.g., switch on the low-side FET and switch off the high-side FET), thus allowing for prompt switching between low-side FET and high-side FET control phases.

In some embodiments, the processing logic identifies another pulse (e.g., a negative pulse) while controlling the operation of the high-side FET. In response to identifying the negative pulse, the processing logic can control the operation of the low-side FET (e.g., switch off the high-side FET and switch on the low-side FET).

In some embodiments, the processing logic can then identify another pulse (e.g., a positive pulse). In response to identifying the positive pulse, the processing logic can control the operation of the high-side FET (e.g., switch off the low-side FET and switch on the high-side FET). In some embodiments, the low-side and high-side FET control phases are interchangeable.

Figure 5:
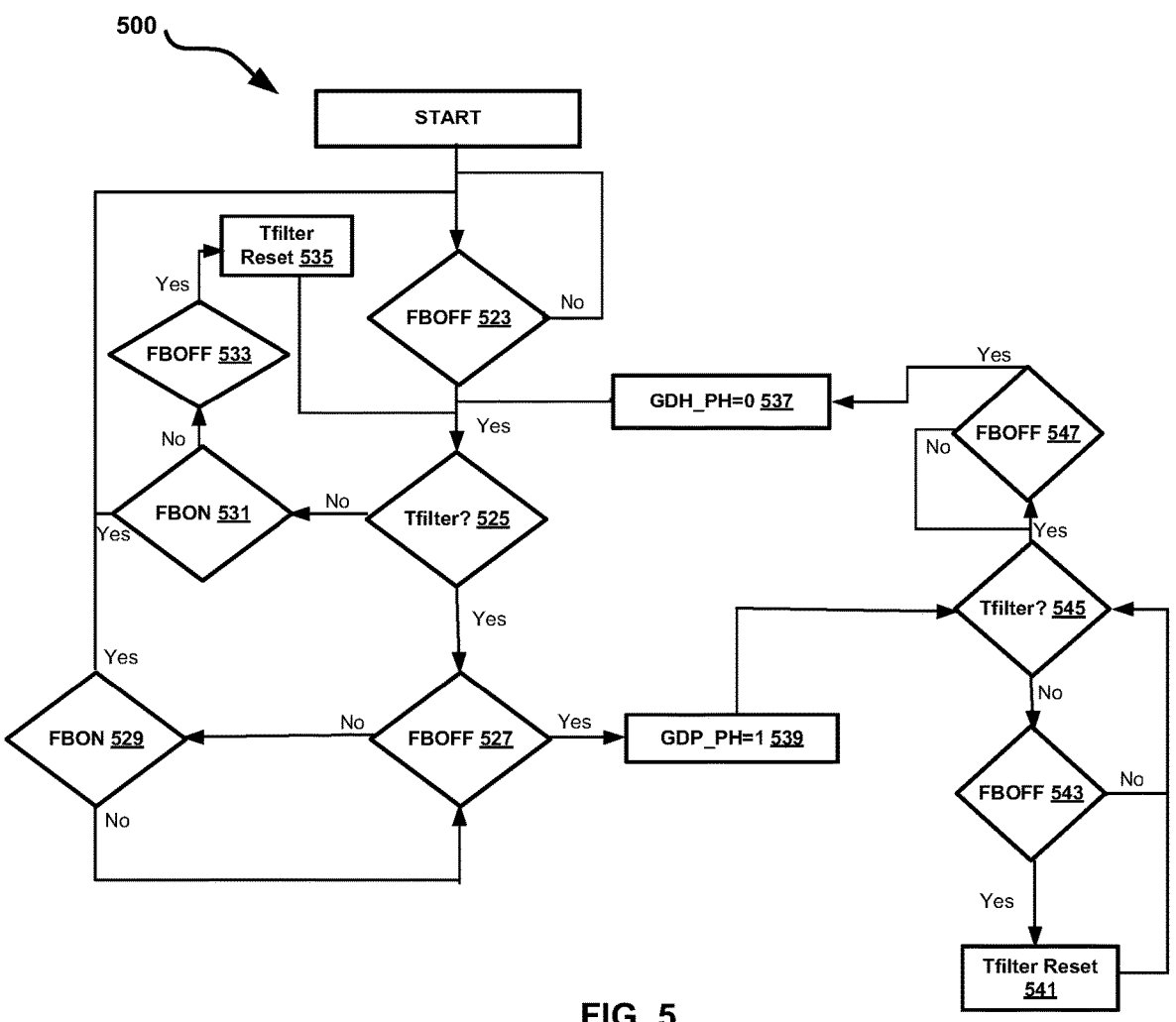
FIG. 5 is a flow diagram of another method of controlling operation of a primary high-side field-effect transistor and a primary low-side field-effect transistor using a pulse edge transformer in a primary-controlled flyback converter, according to one embodiment.

FIG. 5 is a flow diagram of a method 500 of controlling operation of a primary high-side field-effect transistor (FET) and a primary low-side FET using a pulse edge transformer in a primary-controlled flyback converter, in accordance with some embodiments of the present disclosure. The method 500 may be performed by processing logic that comprises hardware (e.g., circuitry, dedicated logic, programmable logic, microcode, etc.), software, firmware, or a combination thereof. In one embodiment, a primary-side controller in a primary-controlled AC-DC flyback converter performs the method 500.

Referring to FIG. 5, the method 500 begins, at block 523, by the processing logic (e.g., a primary-side controlled Universal Serial Bus Power Delivery (USB-PD) AC-DC converter) identifying a negative pulse ("FBOFF"). The negative pulse can be transmitted from a pulse edge transformer (PET) (e.g., the pulse edge transformer 111 of FIG. 1) and decoded using, for example, the time division multiplexing logic 113 of FIG. 1. In some embodiments, at block 537, in response to identifying the negative pulse, the processing logic can control operation of the low-side FET (e.g., switch on the low-side FET).

At block 525, in response to identifying the negative pulse, the processing logic determines that a timing filter ("Tfilter") has expired. The timing filter can be a predefined period of time, such as zero to any amount of time. For example, the timing filter can be a period of time of 20 nanoseconds. Determining that the timing filter has expired can include determining that the period of time of 20 nanoseconds has been satisfied (e.g., has reached a value of 0).

At block 531, in response to determining that the timing filter has not expired, the processing logic determines whether a positive pulse ("FBON") has been transmitted during the period of time of the timing filter. At block 533, in response to determining that a positive pulse has not been transmitted, the processing logic determines whether another (e.g., a second) negative pulse ("FBOFF") has been transmitted. At block 535, in response to determining that the second negative pulse has been transmitted, the processing logic resets the timing filter to an initial value.

At block 527, in response to determining that the timing filter has expired, the processing logic determines whether another (e.g., a second) negative pulse ("FBOFF") has been transmitted. At block 529, in response to determining that another negative pulse has not been transmitted, the processing logic determines whether a positive pulse has been transmitted. In response to determining that the positive pulse has been transmitted, the processing logic resets the timing filter to the initial value at block 535. At block 539, in response to determining at block 527 that another negative pulse has been transmitted, the processing logic can control operation of the high-side FET (e.g., switch off the low-side FET and switch on the high-side FET).

At block 545, the processing logic determines whether the timing filter ("Tfilter") has expired. At block 547, in response to determining that the timing filter has expired, the processing logic determines whether a negative pulse has been transmitted. At block 537, in response to determining that the negative pulse has been transmitted, the processing logic can control operation of the low-side FET (e.g., switch off the high-side FET and switch on the low-side FET). At block 543, in response to determining that the timing filter has not expired, the processing logic determines whether a negative pulse has been transmitted. At block 541, in response to determining that the negative pulse has been transmitted, the processing logic resets the timing filter to the initial value.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, the SBPD device is a USB-PD device that is compatible with the USB-PD standard or more generally with the USB standard. For example, the SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as over-voltage (OV), under-voltage (UV), over-current protection (OCP), short circuit protection (SCP), power factor correction (PFC), SR, or the like. The information can include fault information for any of these different functions.

In other embodiments, the SBPD device is connected to power source, such as a wall socket power source that provides AC power. In other embodiments, power source may be a different power source, such as a battery, and may provide DC power to SBPD device. The power converter may convert the power received from power source (e.g., convert power received to Vbus_in). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side).

In some embodiments, the SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from power converter. The power control analog subsystem may output Vbus_in. In some embodiments, power control analog subsystem is a USB Type-C controller compatible with the USB Type-C™ standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, power converter and power control analog subsystem may each be discrete ICs with separate packaging and pin configurations.

In some embodiments, the SBPD device may provide a complete USB Type-C™ and USB-Power Delivery port control solution for notebooks, dongles, monitors, docking stations, power adapters, vehicle chargers, power banks, mobile adaptors, and the like.

Embodiments when using isolation or level shifters may require some driver circuit. The driver circuit may be as simple as using a PWM output from the secondary-side controller, to drive a capacitive coupled controller. The driver circuit can be an elaborate structure when driving a pulse transformer.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts concretely. As used in this application, the term "or" is intended to mean an inclusive "or" rather than an exclusive "or." Unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. A method comprising:
identifying, by a primary-side controlled Universal Serial Bus Power Delivery (USB-PD) alternating current to direct current (AC-DC) converter, a first pulse, wherein the first pulse is received from a pulse transformer;
determining that a threshold duration of time is satisfied;
in response to determining that the threshold duration of time is satisfied, identifying a second pulse, wherein the second pulse is received from the pulse transformer;
wherein the first pulse and the second pulse are used for control of a high-side field effect transistor (FET) and a low-side FET, wherein the high-side FET is coupled to an active clamp flyback (ACF) circuit of the USB-PD AC-DC converter, and wherein the low-side FET is coupled to a flyback transformer of the USB-PD AC-DC converter; and
in response to identifying the second pulse, controlling operation of the high-side FET or the low-side FET.

2. The method of claim 1, wherein the USB-PD AC-DC converter is initially controlling the operation of the low-side FET.

3. The method of claim 1, wherein controlling the operation of the high-side FET or the low-side FET further comprises:
controlling the operation of the high-side FET.

4. The method of claim 1, further comprising:
identifying a third pulse, wherein the third pulse is received from the pulse transformer, and wherein the third pulse is a positive pulse; and
in response to identifying the third pulse, controlling the operation of the high-side FET or the low-side FET.

5. The method of claim 4, wherein controlling the operation of the high-side FET or the low-side FET further comprises:
controlling the operation of the low-side FET.

6. The method of claim 1, wherein the first pulse is a negative pulse, and wherein the second pulse is a negative pulse.

7. The method of claim 1, further comprising:
determining that the threshold duration of time is not satisfied;
identifying a third pulse, wherein the third pulse is received from the pulse transformer, and wherein the third pulse is a positive pulse; and
controlling the operation of the low-side FET.

8. A Universal Serial Bus Power Delivery (USB-PD) alternating current to direct current (AC-DC) power supply comprising:
a flyback transformer;
an active clamp flyback (ACF) circuit;
a high-side field effect transistor (FET) coupled between the flyback transformer and the ACF circuit;
a low-side FET coupled to the flyback transformer;
a pulse transformer; and
a primary-side controller coupled to receive signals from the pulse transformer and to control operation of the high-side FET and the low-side FET, wherein the primary-side controller is to:
identify a first pulse, wherein the first pulse is received from the pulse transformer;
determine that a threshold duration of time is satisfied;
in response to determining that the threshold duration of time is satisfied, identify a second pulse, wherein the second pulse is received from the pulse transformer; and
in response to identifying the second pulse, control operation of the high-side FET or the low-side FET.

9. The USB-PD AC-DC power supply of claim 8, wherein the USB-PD power supply is initially controlling the operation of the low-side FET.

15 16

10. The USB-PD AC-DC power supply of claim 8, wherein, to control the operation of the high-side FET or the low-side FET, the primary-side controller is further to:
control the operation of the high-side FET.

11. The USB-PD AC-DC power supply of claim 8, wherein the primary-side controller is further to:
identify a third pulse, wherein the third pulse is received from the pulse transformer, and wherein the third pulse is a positive pulse; and
in response to identifying the third pulse, control the operation of the high-side FET or the low-side FET.

12. The USB-PD AC-DC power supply of claim 11, wherein, to control the operation of the high-side FET or the low-side FET, the primary-side controller is further to:
control the operation of the low-side FET.

13. The USB-PD AC-DC power supply of claim 8, wherein the first pulse is a negative pulse, and wherein the second pulse is a negative pulse.

14. The USB-PD AC-DC power supply of claim 8, wherein the primary-side controller is further to:
determine that the threshold duration of time is not satisfied;
identify a third pulse, wherein the third pulse is received from the pulse transformer, and wherein the third pulse is a positive pulse; and
control the operation of the low-side FET.

15. A Universal Serial Bus Power Delivery (USB-PD) flyback converter system, the system comprising:
a flyback transformer;
an active clamp flyback (ACF) circuit;
a high-side field-effect transistor (FET) coupled between the flyback transformer and the ACF circuit;
a low-side FET coupled to the flyback transformer;
a pulse transformer; and
a primary-side controller coupled to receive signals from the pulse transformer and to control operation of the high-side FET and the low-side FET, the primary-side controller configured to:

identify a first pulse, wherein the first pulse is received from the pulse transformer;
determine that a threshold duration of time is satisfied;
in response to determining that the threshold duration of time is satisfied, identify a second pulse, wherein the second pulse is received from the pulse transformer; and
in response to identifying the second pulse, control operation of the high-side FET or the low-side FET.

16. The system of claim 15, wherein the system is initially controlling the operation of the low-side FET.

17. The system of claim 15, wherein to control the operation of the high-side FET or the low-side FET, the primary-side controller is to control the operation of the high-side FET.

18. The system of claim 15, wherein the primary-side controller is further configured to:
identify a third pulse, wherein the third pulse is received from the pulse transformer, and wherein the third pulse is a positive pulse; and
in response to identifying the third pulse, control the operation of the high-side FET or the low-side FET.

19. The system of claim 18, wherein to control the operation of the high-side FET or the low-side FET, the primary-side controller is to control the operation of the low-side FET.

20. The system of claim 15, wherein the primary-side controller is further configured to:
determine that the threshold duration of time is not satisfied;
identify a third pulse, wherein the third pulse is received from the pulse transformer, and wherein the third pulse is a positive pulse; and
control the operation of the low-side FET.

* * * * *